Patented Sept. 15, 1953

2,651,946

UNITED STATES PATENT OFFICE 2,651,946

DIFFERENTIAL GEARING

George Richard Stevens, Albuquerque, N. Mex.

Application February 4, 1949, Serial No. 74,503

1 Claim. (Cl. 74—711)

This invention is directed to differential gearing, and in particular to gear mechanisms known as differential locks.

The objects of the invention are to produce a differential lock of simplified construction, compact and of inexpensive manufacture, easy to repair, and strong, durable and quiet in operation.

In general these objects are obtained by including within the differential case additional sets of gears connected respectively to the axle shafts and to each other by overrunning clutches. The latter are mounted upon a single shaft, thus making a simple, compact and easily repairable differential.

The means by which the objects of the invention are obtained are more fully described with reference to the accompanying drawings, in which.

Figure 1:
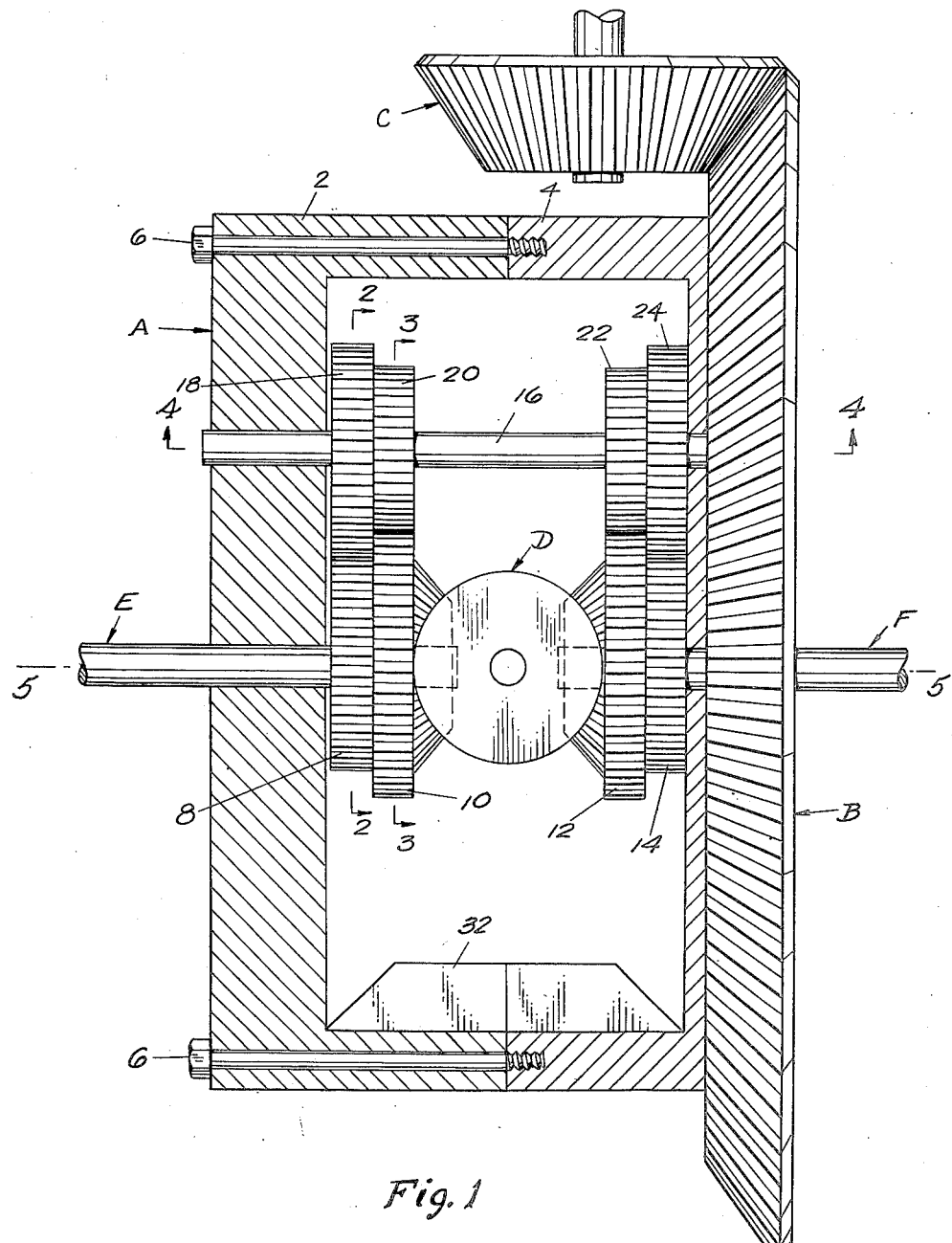
Fig. 1 is a sectional view through the differential.

The differential casing A is composed of separable parts 2 and 4 joined by bolts 6. Ring gear B secured to part 4 is driven by pinion C in the usual manner.

Mounted within casing A are the conventional differential spider, pinions and gears D connected to axle shafts E and F, respectively. The differential spider is held by the casing A, and carries the differential pinions according to conventional construction.

Axle shaft E has fixed thereto a pair of gears 8 and 10 of different diameters, while shaft F has a pair of similar gears 12 and 14 fixed thereto, said gears being mounted within the casing A adjacent the differential gears of assembly D.

Figure 2:
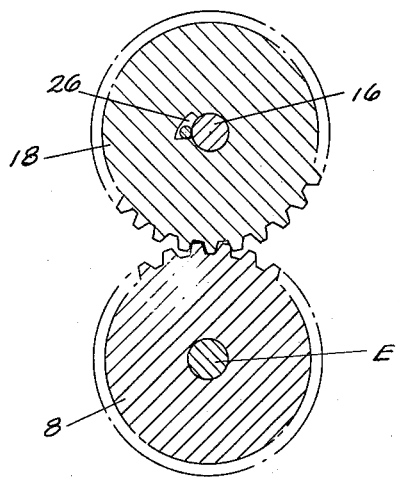
Fig. 2 is a cross-sectional view on the line 2—2, Fig. 1.
Figure 3:
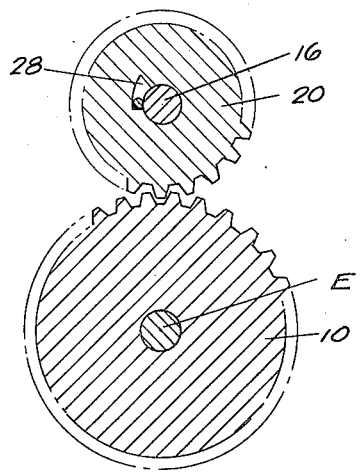
Fig. 3 is a cross-sectional view on the line 3—3, Fig. 1.
Figure 4:
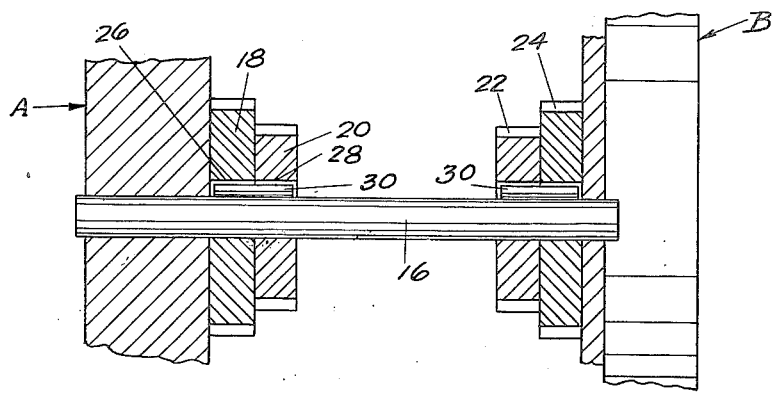
Fig. 4 is a cross-sectional view on the line 4—4, Fig. 1.
Figure 5:
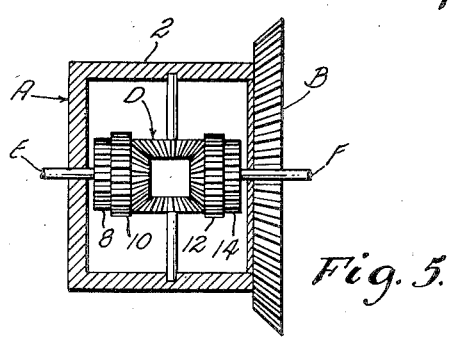
Fig. 5 is a cross-sectional view on the line 5—5 of Fig. 1.

Mounted upon shaft 16, journaled in casing A, are a first pair of gears 18 and 20 meshing with gears 8 and 10, respectively, and a second pair of gears 22 and 24 meshing with gears 12 and 14, respectively. Gears 18 and 24 are formed with clockwise overrunning clutches as indicated at 26, Figs. 2 and 4. Gears 20 and 22 are formed with counter-clockwise overrunning clutches 28. Any suitable overrunning clutch mechanism may be employed, the mechanism herein described being as example only. As shown, the gears are clutched to shaft 16 by pins 30, one pin serving each pair of gears.

A weight 32 is attached to casing A to counterbalance shaft 16 and its associated gears.

The mechanism operates as the ordinary differential gear when shafts E and F are turning at the same speed under equal loads. If axle E revolves faster than axle F, then gear 10 turning at an increased speed over the rotation of casing A will rotate gear 20 and clutch it to shaft 16 causing said shaft to rotate and clutch gear 24, thus driving gear 14 and shaft F. Similarly, should the speed of axle F increase over that of axle E, a drive will be created through gears 12, 22, shaft 16, and gears 18 and 8.

The difference in size of the gears determines the amount one axle can revolve faster than the other before there is a power transmission to the slower turning axle, this being necessary as in the case of vehicular drive wherein one axle rotates faster than the other when the vehicle is turning a corner. By means of the arrangement shown, the drive effect is obtained both in forward and reverse drives.

The embodiment of the invention described is of inexpensive manufacture, and easy to maintain due to the use of but a single countershaft 16 with the overrunning clutches and gears mounted thereon. It is feasible to incorporate the clutching feature in the pairs of gears 8, 10 and 12, 14, respectively, or in gears 18, 20 and 12, 14, for example, but at the loss of ease of repairability. The compactness of the mechanism makes its use practical where space is limited as when two ratio differentials are used in trucks.

Having now described the means by which the objects of the invention are obtained, I claim:

In a differential mechanism having a differential casing secured to ring gear, differential gearing therein joined to axle shafts, and means constituting a differential lock connected to said gearing, said means comprising pairs of gears mounted upon said axle shafts, respectively, within said casing, a countershaft journaled to and lying within said casing, second pairs of gears meshed, respectively with said gears on said axle shafts, the gears in each of said pairs of gears being of different size, and overrunning clutch means connecting said second pairs of gears to said countershaft.

GEORGE RICHARD STEVENS.

References Cited in the file of this patent

UNITED STATES PATENTS

| Number | Name | Date |
|---|---|---|
| 1,918,864 | Priest | July 18, 1933 |
| 2,103,143 | Brown | Dec. 21, 1937 |
| 2,459,969 | Schweickart | Jan. 25, 1949 |

FOREIGN PATENTS

| Number | Country | Date |
|---|---|---|
| 883,892 | France | July 22, 1943 |